United States Patent Office 3,254,068
Patented May 31, 1966

3,254,068
DYED MODIFIED ACRYLONITRILE AND DYED METHACRYLONITRILE POLYMERS
Clarence Lee Furrow, Bartlesville, Okla., assignor to Phillips Petroleum Company, a corporation of Delaware
No Drawing. Filed Aug. 7, 1961, Ser. No. 129,556
10 Claims. (Cl. 260—88.7)

This invention relates to a modified acrylonitrile polymer and to a modified methacrylonitrile polymer, said polymers having a greatly increased dye receptivity. In one of its aspects, the invention relates to a method for the production of a dyed modified acrylonitrile polymer and/or a dyed modified methacrylonitrile polymer which comprises contacting said nitrile with a labile hydrogen-containing compound in the presence of a free-radical agent, or in presence of free radicals produced in situ by activating rays such as alpha rays, beta rays, gamma rays, X-rays and ultraviolet rays. In another aspect of the invention, it relates to the modified polymer which can be obtained by the method of the invention in which activating rays are employed. In a further aspect of the invention, it relates to a product which can be obtained by contacting the modified polymer of the invention with an aqueous acid or base, as further described herein. In a still further aspect, the invention relates to the production of a dyed polymer.

In the field of polymers, considerable work has been carried out on the polymerization and copolymerization of acrylonitrile. Resinous polymers of acrylonitrile have been prepared, and acrylonitrile has long been used as a comonomer with conjugated dienes in the preparation of special types of synthetic rubber.

In the methods of the prior art, acrylonitrile is polymerized in the presence of free radical generating substances or catalysts. While acrylonitrile has been copolymerized with various polymerizable materials, a satisfactory modified polymer of acrylonitrile has not been obtained especially as this is related to dye receptivity. Acrylonitrile polymers, modified so as to obtain other reactive groups along the polymer chain, would be very beneficial. These reactive groups could be utilized to improve the dyeability and/or other characteristics of the polymer.

It has now been discovered that novel dyed modified polymers of at least one of acrylonitrile and methacrylonitrile can be prepared by contacting the unsaturated nitrile with a labile hydrogen-containing compound in the presence of a free radical agent or generator and then dyeing the polymers obtained. Modified polymers have been produced employing chemical sources of free radical agents and free radicals generated by activating rays. Of the activating rays, gamma radiation appears to yield modified polymers having a superior dye receptivity.

Accordingly, it is an object of the present invention to provide a method for the production of a modified polymer of at least one of acrylonitrile and methacrylonitrile. Accordingly, it is another object of the present invention to provide a method for the production of a modified polymer of at least one of acrylonitrile and methacrylonitrile having a greatly increased dye receptivity. It is a further object of this invention to provide a modified polymer of at least one of acrylonitrile and methacrylonitrile. It is a further object of this invention to provide a modified polymer of at least one of acrylonitrile and methacrylonitrile having greatly improved dye receptivity. It is a further object of this invention to provide a modified polymer of at least one of acrylonitrile and methacrylonitrile which is so modified as to contain reactive groups along the polymer chain permitting their utilization to improve dyeability and/or other characteristics of the polymer. A further object is to provide a dyed modified polymer.

Other aspects, objects and the several advantages of this invention are apparent from a study of this disclosure and the appended claims.

According to the present invention, novel dyed modified polymers of at least one of acrylonitrile and methacrylonitrile can be prepared by a method which comprises contacting the unsaturated compound with a labile hydrogen-containing compound in the presence of a free radical agent and then dyeing the modified polymer thus obtained. Also, according to the present invention, modified polymers of acrylonitrile and of methacrylonitrile of improved dye receptivity are obtained employing activating rays to generate the free radicals in situ, especially superior modified polymers being obtained by contacting the unsaturated compound with the labile hydrogen-containing compound under influence of ionizing radiation, e.g., gamma radiation.

More specifically, according to the present invention, there is produced a modified polymer of substantially increased dye receptivity by a method which comprises subjecting at least one of acrylonitrile and methacrylonitrile to contact with a labile hydrogen-containing compound in the presence of ionizing radiation, said labile hydrogen-containing compound being selected from the group consisting of $$R-NO_2 \quad \text{(I)}$$

$$R-\overset{O}{\underset{\|}{C}}-R' \quad \text{(II)}$$

$$R-O-\overset{O}{\underset{\|}{C}}-(CH_2)_n-\overset{O}{\underset{\|}{C}}-O-R \quad \text{(III)}$$

$$R-\overset{O}{\underset{\|}{C}}-O-\overset{O}{\underset{\|}{C}}-R \quad \text{(IV)}$$

$$R-OH \quad \text{(V)}$$

$$R-C\equiv N \quad \text{(VI)}$$

wherein R is selected from the group consisting of primary and secondary alkyl radicals, containing from 1 to 10 carbon atoms, $n$ is a whole integer of from 0 to 2, inclusive, and R' is selected from the group consisting of $$-R, \ -(CH_2)_n-\overset{O}{\underset{\|}{C}}-R, \ -(CH_2)_n-\overset{O}{\underset{\|}{C}}-O-R, \text{ and } -O-R$$

wherein R and $n$ are as previously defined.

The modified polymers of acrylonitrile and of methacrylonitrile have the following structural characteristics:

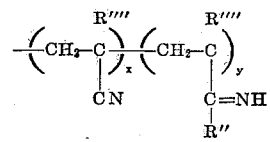

wherein R'' is selected from the group consisting of $$-R'''-NO_2 \quad \text{(I)}$$

$$-R'''-\overset{O}{\underset{\|}{C}}-R' \quad \text{(II)}$$

$$-R'''-O-\overset{O}{\underset{\|}{C}}-(CH_2)_n-\overset{O}{\underset{\|}{C}}-O-R \quad \text{(III)}$$

$$-R'''-\overset{O}{\underset{\|}{C}}-O-\overset{O}{\underset{\|}{C}}-R \quad \text{(IV)}$$

$$-R'''-OH \quad \text{(V)}$$

$$-R'''-C\equiv N \quad \text{(VI)}$$

wherein R''' is a 1 to 10 carbon alkylene radical, $n$ is a whole integer of from 0 to 2, R is selected from the group consisting of primary and secondary alkyl radicals containing from 1 to 10 carbon atoms, R' is selected from the group consisting of

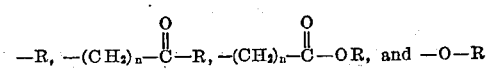

and x/y is approximately 1 to 20 and wherein R'''' is selected from the group consisting of hydrogen and methyl.

In the preferred form of the invention, R is methyl.

As stated, according to the invention, there is provided a method of producing a dyed modified polymer by steps comprising reacting at least one of acrylonitrile and methacrylonitrile with a labile hydrogen-containing compound in the presence of a free radical agent, recovering polymer thus produced, and then dyeing the polymer. Dyeing of the modified polymers can be effected by contacting the polymers with a dye solution, preferably aqueous. While acid, basic or neutral dyes can be used, the acid or basic dyes are preferred. The contacting of the polymer with the aqueous dye solution can be carried out at temperatures generally ranging from ambient temperatures up to the softening point of the particular polymer, and usually ranging from 25° C. to 75° C.

Some examples of labile hydrogen-containing compounds which can be employed in the process of this invention are

| | |
|---|---|
| nitromethane | methyl 4-oxopentanoate |
| nitroethane | hexyl 4-oxodecanoate |
| nitrohexane | dimethyl oxalate |
| acetone | dihexyl oxalate |
| methyl ethyl ketone | dimethyl malonate |
| methyl acetate | di-n-butyl malonate |
| ethyl propionate | di-n-hexyl succinate |
| methyl butyrate | acetic anhydride |
| n-hexyl acetate | caproic anhydride |
| hexyl caproate | nitrodecane |
| 2,3-butanedione | di-n-decyl ketone |
| 7,8-tetradecanedione | decyl methyl ketone |
| 2,4-pentanedione | octyl-n-heptyl ketone |
| 2,4-hexanedione | 11,12-docosanedione |
| 7,9-pentadecanedione | decyl-3-oxodocosionate |
| 2,5-hexanedione | decyl acetate |
| 2,5-octanedione | methanol |
| 7,10-hexadecanedione | ethanol |
| methyl 2-oxopropionate | isopropanol |
| ethyl 2-oxobutyrate | sec-octanol |
| hexyl 2-oxooctanoate | n-decanol |
| methyl 3-oxopropionate | acetonitrile |
| propyl 2-oxobutyrate | propionitrile |
| hexyl 3-oxopropionate | capronitrile |
| hexyl 3-oxononanoate | |

The polymers prepared by the process of this invention are actually modified polymers of acrylonitrile and methacrylonitrile in which the modification occurs during polymerization. The labile hydrogen-containing compound reacts with the nitrile groups attached to carbon atoms of the polymer chain. For example, when a mixture of acetone and acrylonitrile is contacted with ionizing radiation according to the process of this invention, the polymer has the following configuration, wherein the ratio x/y lies within the range of from 1 to 20.

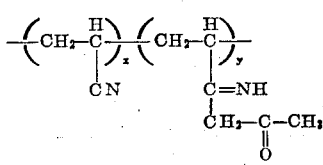

Furthermore, when methacrylonitrile is used in lieu of acrylonitrile, the corresponding methyl substituted derivative is formed. Similarly with other reactants, such as

| | |
|---|---|
| nitromethane | acetic anhydride |
| methyl acetate | methanol |
| dimethyl oxalate | acetonitrile | the reaction occurs in an analagous manner as indicated in the following formulas. The compounds obtained are:

MIXTURE OF NITROMETHANE AND ACRYLONITRILE

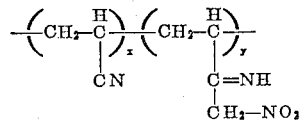

MIXTURE OF METHYL ACETATE AND ACRYLONITRILE

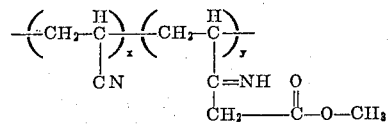

MIXTURE OF DIMETHYL OXALATE AND METHACRYLONITRILE

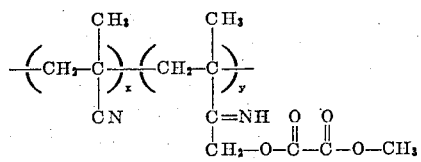

MIXTURE OF ACETIC ANHYDRIDE AND ACRYLONITRILE

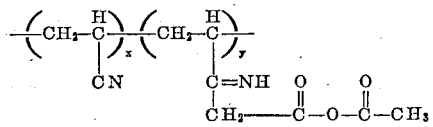

MIXTURE OF METHANOL AND METHACRYLONITRILE

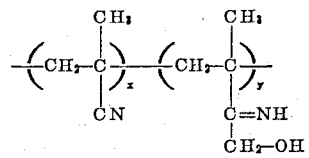

MIXTURE OF ACETONITRILE AND ACRYLONITRILE

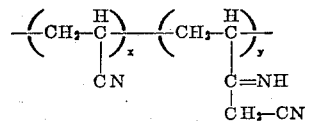

MIXTURE OF ISOPROPANOL AND ACRYLONITRILE

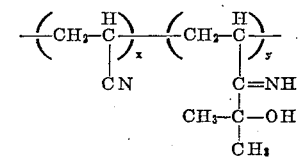

The process of the present invention is carried out by subjecting a mixture of the above-described reactants to the action of a free radical agent, or ultraviolet light or ionizing radiation at temperatures usually within the range between −25° C. and 75° C. The mol ratio of unsaturated nitrile to labile hydrogen-containing compound usually will be within the range between 100/1 and 1/200. The pressure in the reaction zone is not critical, and will generally be within the range between atmospheric and the autogeneous pressure developed under closed conditions at the temperature chosen for the reaction. This pressure will generally not exceed 100 p.s.i. It is preferred to agitate the reaction mixture during radiation.

Chemical sources of free radicals are peroxides, hydroperoxides, azo compounds and redox systems. Free radicals can be generated in situ by means of actinic radiation. Actinic radiation useful in the practice of this invention includes activating rays such as ultraviolet rays having a wave length in the range of 100 to 3800 angstroms, and ionizing rays such as alpha rays, beta rays, gamma rays, X-rays, deutrons, protons, and neutrons. The ultraviolet rays can be supplied from mercury lamps or other equivalent sources. The ionizing radiation can be supplied from such sources as cathode tubes, accelerators, such as cyclotrons, synchrotrons, betarons, natural and artificial radioactive elements, spent nuclear fuel elements and the like.

Representative chemical sources of free radicals which can be used include ditertiary alkyl peroxides such as di-tert-butyl peroxide and other peroxides and hydroperoxides such as alkyl hydroperoxides, alkyl peroxy esters, diacyl peroxides and the like. Azo compounds which can be used include those having an acyclic azo group, —N=N—, bonded to different non-aromatic carbons, i.e., aliphatic or cycloaliphatic carbons at least one of which is tertiary, e.g., $\alpha,\alpha'$azodiisobutyronitrile, $\alpha,\alpha'$azobis($\alpha,\gamma'$dimethylvaleronitrile), and the like, such as those disclosed in U.S. 2,471,959 and 2,503,252. Redox systems are normally employed as aqueous systems, using such materials as ferrous sulfate in conjunction with such reagents as pyrophosphates.

The amount of a chemical source of free radicals which can be used will vary widely, but will generally range from 0.1 to 10 percent by weight of the nitrile monomer, preferably from 0.5 to 5 percent on the same basis.

The actinic radiation which can be used to generate free radicals in situ in the method of this invention will generally have an energy level in the range of 3.1 to $1 \times 10^8$ electron volts. The radiation dose rate will generally be from $10^3$ to $10^{10}$ roentgens per hour, and the total dosage is usually in the range from $10^5$ to $10^{11}$ roentgens. A preferred total dosage is within the range of $10^6$ to $10^{10}$ roentgens. A roentgen is equal to $5.80 \times 10^{13}$ electron volts.

The mixture of unsaturated nitrile and the labile hydrogen-containing compound are contacted as herein exemplified and, at the end of the reaction time, the products are recovered and worked up by any of the well-known conventional methods. For example, the unreacted materials can be removed under reduced pressure. The products which are recovered are modified polymers of acrylonitrile and methacrylonitrile. The presence of the modifying groups improves the dyeability of the polymers.

*Example I*

A run was carried out in which a mixture of acrylonitrile and acetone was subjected to the beam from an electron accelerator.

In this run, a solution of 5.3 grams (0.1 mol) of acrylonitrile in 232 grams (4 mol) of acetone was charged to a glass flask and irradiated with the beam from an electron accelerator. The total dosage was approximately $5 \times 10^6$ roentgens. The flask contents were then placed under reduced pressure (10–20 mm. Hg absolute), and the unreacted materials present were evaporated off. The remaining material was a solid polymer, amounting to 2.4 grams. The estimated molecular weight of this polymer was 500–1000.

Infrared analysis of this polymer showed the presence of methyl groups, carbonyl groups, imino groups and —C≡N groups, and the relative band strengths in the infrared spectra established the presence of one —C≡N group per 9 carbons, and one carbonyl and one imino group per 9 carbons.

These conditions are consistent with the following structure, wherein approximately 50 percent of the nitrile groups have reacted with the ketone, i.e. where $x/y$ is approximately 1.0.

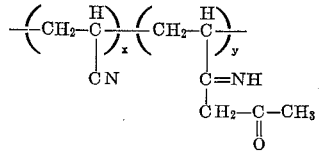

A 0.2 gram sample of this polymer was placed in 15 cc. of concentrated hydrochloric acid (36 weight percent HCl) and heated to reflux. After maintaining the mixture at this temperature for 6 hours, the acid was evaporated off. The remaining residue was placed in a Soxhlet extractor and extracted with anhydrous acetone to dissolve the polymer and leave NH$_4$Cl behind. The acetone solution was then evaporated to dryness and the residue was analyzed by infrared.

The infrared spectrum was consistent with hydrolysis of the nitrile groups of the above polymer to yield carboxyl groups, thus the structure is indicated to be as follows, wherein $x/y$ is approximately 1.0.

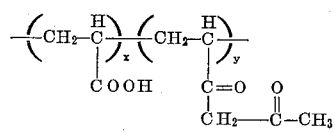

In each of two runs, a 0.05 gram sample of the unhydrolyzed polymer was dissolved in warm 95 percent ethanol, and the solution was added to approximately 10 ml. of a 2,4-dinitrophenylhydrazine-EtOH-H$_2$SO$_4$-H$_2$O solution. An orange precipitate appear. Two drops of water were then added to aid precipitation.

The precipitates from the two runs were combined and dried, and the precipitate was then examined by infrared analysis.

The infrared bands indicate that the structure of the precipitate was

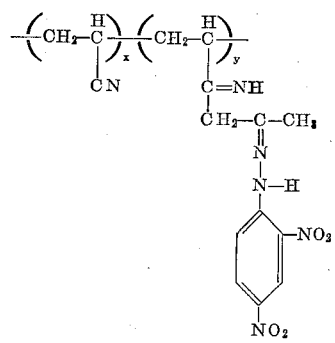

*Example II*

A series of runs was carried out in which mixtures of acrylonitrile and various labile hydrogen-containing compounds were subjected to the beam from an electron accelerator.

These runs were carried out by the procedure of Example I, and in each run, the mixture was irradiated to a total dose of $10^7$ roentgens. The irradiations were carried out in glassware at atmospheric pressure and room temperature. The results of these runs are expressed below in Table I.

TABLE I

| Run No. | Charge | | | | Product | |
|---|---|---|---|---|---|---|
| | Grams Acrylonitrile | Mols Acrylonitrile | Labile H Compound | Mols Labile H Compound | Wt. Grams | Appearance |
| 1 [1] | 5.3 | 0.1 | Acetone | 4.0 | 2.4 | Dark, brown grease. |
| 2a | 10.6 | 0.2 | ___do___ | 1.0 | 6.8 | Off-white, chalky polymer (insoluble). |
| 2b | | | | | 3.7 | Dark brown plastic (soluble). |
| 3 | 10.6 | 0.2 | Acetone | 0.1 | 7.7 | Off-white amorphous solid. |
| 4a | 2.1 | 0.04 | Methyl Formate | 0.20 | 1.2 | Off-white amorphous solid (soluble). |
| 4b | | | | | 0.1 | Off-white amorphous solid (insoluble). |
| 5a | 2.6 | 0.05 | Acetonitrile | 0.28 | 1.3 | Do. |
| 5b | | | | | 0.1 | Off-white amorphous solid (soluble). |
| 6 | 3.5 | 0.066 | Methanol | 0.333 | 2.1 | Off-white chalky solid. |
| 7 | 2.1 | 0.04 | Ethanol | 0.20 | 1.7 | Do. |
| 8 | 2.1 | 0.04 | Isopropanol | 0.20 | 1.9 | Do. |

[1] This polymer is the material of Example I, and is repeated here for comparison.

In this table, three runs are shown which are divided into two parts, *a* and *b*. These runs were actually carried out by the same procedure as the other runs, except that a portion of the polymer was found to be soluble in the excess labile hydrogen-containing compound. The soluble and insoluble portions were separated by filtration, followed by evaporation of excess labile hydrogen compound.

In these runs, the acrylonitrile, labile hydrogen-containing compound, and azobisisobutyronitrile (AIBN) were charged to a glass lined bomb, and the contents of the bomb were warmed to 80° C. and were maintained at this temperature for 4 hours. The product from these runs was recovered by the method of Example II. The results of these tests are expressed below in Table II.

TABLE II

| Run No. | Charge | | | | | Product | |
|---|---|---|---|---|---|---|---|
| | Grams Acrylonitrile | Mols Acrylonitrile | Labile H Compound | Mols Labile Compound | Grams AIBN [1] | Wt. Grams | Appearance |
| 9 | 10.6 | 0.2 | Acetone | 0.1 | 0.5 | 10.9 | Off-white amorphous solid.[2] |
| 10 | 10.6 | 0.2 | ___do___ | 1.0 | 0.5 | 8.1 | Do. |
| 11a | 1.8 | 0.0345 | ___do___ | 1.38 | 0.1 | 0.175 | Tan amorphous solid (soluble). |
| 11b | | | | | | 0.338 | Tan amorphous solid (insoluble) |
| 12a | 10.6 | 0.2 | Methyl Formate | 1.0 | 0.5 | 1.7 | Off-white amorphous solid (insoluble). |
| 12b | | | | | | 8.0 | Off-white amphorous solid (soluble). |
| 13a | 1.0 | 0.02 | Methyl Formate | 2.2 | 0.1 | 0.035 | Off-white amorphous solid (insoluble). |
| 13b | | | | | | 0.254 | Tan amorphous solid (soluble). |
| 14 | 26.5 | 0.5 | Acetonitrile | 2.0 | 0.2 | 14.8 | Off-white amorphous solid. |
| 15 | 1.2 | 0.0227 | ___do___ | 2.5 | 0.1 | 0.316 | Tan amorphous solid. |
| 16a | 1.0 | 0.02 | Ethanol | 2.1 | 0.1 | 0.035 | Yellow solids (insoluble). |
| 16b | | | | | | 0.415 | Brown viscous liquid. |

[1] Azobisisobutyronitrile.
[2] The infrared spectrum of this polymer was similar to that of the polymer in Example I.

Example III

A run was carried out in which a mixture of acrylonitrile and acetone was subjected to the rays from a mercury lamp. In this run 10.6 grams (0.2 mol) of acrylonitrile and 58 grams (1.0 mol) of acetone were charged to a quartz flask which was illuminated by 100 watt high pressure mercury vapor lamp. This ultraviolet irradiation was carried out at room temperature and atmospheric pressure for 4 hours. The product was then recovered by the method of Example I. The product amounted to 0.1 gram of tan amorphous solid. An elemental analysis of this material showed 65.0 weight percent carbon, 7.0 weight percent hydrogen and 21.5 weight percent nitrogen. The infrared spectrum of this product was very similar to the spectrum of the product of Example I.

Example IV

A series of runs were carried out in which mixtures of acrylonitrile with various labile hydrogen-containing compounds were contacted with azobisisobutyronitrile, a chemical free radical source.

In Table II, 4 runs are shown in two portions, these runs being of the same type as described in Example II wherein a portion of the product was soluble in the excess labile hydrogen-containing compound.

Example V

The polymers which were prepared in the above examples were then dyed with acidic, neutral and basic dyes.

In these runs, the procedure employed involved stirring 0.1 gram of the dye in 50 ml. water, after which the solution was filtered to remove excess dye. The acrylonitrile polymer was then added to the dye solution and stirred in the solution for 15 minutes. The polymer was then removed, water-washed on a filter and dried. The color intensity of the dyed polymer was then estimated. A polyacrylonitrile which was prepared by polymerization under gamma irradiation at a total dose to $10^7$ roentgens, and in the absence of a labile hydrogen-containing compound, was dyed by the same procedure. The dyed, modified acrylonitrile polymers of this invention were compared to this control run.

The results of these runs are expressed below in Table III.

TABLE III

| Polymer From Run No. | Labile H Compound Used | Mol Acrylonitrile Per Mol Labile H Compound | Initiator | Dye Rating [2] | | | | | Basic Rhodamine [8] |
|---|---|---|---|---|---|---|---|---|---|
| | | | | Acidic | | | Neutral | | |
| | | | | Neolan Blue [3] | Eosin [4] | Rose Bengal [5] | Brilliant Blue [6] | Violet [7] | |
| Control [1] | None | | Gamma | 3 | 2 | 2 | 1 | 1 | 9 |
| 2a | Acetone | 0.2 | do | 13 | 10 | 10 | 2 | 3 | 11 |
| 3 | do | 2.0 | do | 7 | 4 | 4 | 2 | 2 | 10 |
| 10 | do | 0.2 | AIBN | 8 | 6 | 6 | 2 | 3 | 8 |
| 9 | do | 2.0 | AIBN | 5 | 1 | 3 | 1 | 1 | 2 |
| 4a | Methyl Formate | 0.2 | Gamma | 4 | 0 | 1 | 2 | 3 | 1 |
| 12a | do | 0.2 | AIBN | 2 | 0 | 0 | 2 | 1 | 0 |
| 12b | do | 0.2 | AIBN | 1 | 0 | 0 | 2 | 3 | 0 |
| 5a | Acetonitrile | 0.178 | Gamma | 6 | 3 | 5 | 2 | 2 | 3 |
| 14 | do | 0.25 | AIBN | 12 | 9 | 11 | 2 | 3 | 6 |
| 6 | Methanol | 0.2 | Gamma | 9 | 5 | 7 | 2 | 3 | 5 |
| 7 | Ethanol | 0.2 | do | 10 | 7 | 8 | 2 | 3 | 4 |
| 8 | Isopropanol | 0.2 | do | 11 | 8 | 9 | 2 | 3 | 7 |

[1] This polymer was an unmodified polyacrylonitrile prepared by the method of Example I, but with no labile H compound present.
[2] Ranking by relative color intensity: 0=lightest, 13=darkest.
[3] Neolan blue 2R-526B (CIBA).
[4] Eosin (Eastman).
[5] Rose Bengal (Eastman, Technical).
[6] Celanthrene Brilliant Blue FFs-131-13515 Lot 401 (duPont).
[7] Celanthrene Violet CB D31-08542 (duPont).
[8] Rhodamine 5 GDN (duPont).

It can be seen that the modified polymers of this invention have increased dye receptivity. The increased dye receptivity is particularly noticeable when acidic dyes are employed.

The products of this invention are useful in synthetic fibers and as molding resins. They can be blended with other acrylic polymers to provide reactive groups in the blend.

Reasonable variation and modification are possible within the scope of the foregoing disclosure and the appended claims to the invention, the essence of which is that it has been found that a modified polymer of at least one of acrylonitrile and methacrylonitrile can be prepared by subjecting the same together with a labile hydrogen-containing compound to at least one of ionizing and activating rays, as herein described, obtaining products as herein set forth in which the nitrile group has been modified also as set forth, said products having a greatly improved dye receptivity, that a method for producing an improved dyed polymer has been set forth comprising preparing a modified polymer, as herein set forth and described, and then dyeing the same, that the modified polymers produced with gamma radiation are superior, as noted, and that such modified polymers, as herein described, have been provided.

I claim:

1. An acrylonitrile polymer having the following recurring structural units:

$$-(CH_2-\underset{\underset{CN}{|}}{\overset{\overset{R''''}{|}}{C}})_x-(CH_2-\underset{\underset{R''}{|}}{\overset{\overset{R''''}{|}}{C}}=NH)_y-$$

wherein $R''$ is selected from the group consisting of $$-R'''-NO_2 \quad (I)$$

$$-R'''-\overset{O}{\underset{\|}{C}}-R' \quad (II)$$

$$-R'''-O-\overset{O}{\underset{\|}{C}}-(CH_2)_n-\overset{O}{\underset{\|}{C}}-O-R \quad (III)$$

$$-R'''-\overset{O}{\underset{\|}{C}}-O-\overset{O}{\underset{\|}{C}}-R \quad (IV)$$

$$-R'''-OH \quad (V)$$

$$-R'''-C\equiv N \quad (VI)$$

wherein $R'''$ is a 1 to 10 carbon alkylene, $n$ is a whole integer of from 0 to 2, R is selected from the group consisting of primary and secondary alkyls containing from 1 to 10 carbon atom, $R'$ is selected from the group consisting of $$-R, \quad -(CH_2)_n-\overset{O}{\underset{\|}{C}}-R, \quad -(CH_2)_n-\overset{O}{\underset{\|}{C}}-OR, \text{ and } -O-R$$

and $x/y$ is approximately 1 to 20 and wherein $R''''$ is selected from the group consisting of hydrogen and methyl.

2. An acrylonitrile polymer having the following recurring structural units:

$$-(CH_2-\underset{\underset{CN}{|}}{\overset{\overset{H}{|}}{C}})_x-(CH_2-\underset{\underset{CH_3-C-CH_3}{\underset{\|}{O}}}{\overset{\overset{H}{|}}{C}}=NH)_y-$$

wherein $x/y$ is in the range of 1 to 20.

3. An acrylonitrile polymer having the following recurring structural units:

$$-(CH_2-\underset{\underset{CN}{|}}{\overset{\overset{H}{|}}{C}})_x-(CH_2-\underset{\underset{CH_2-NO_2}{|}}{\overset{\overset{H}{|}}{C}}=NH)_y-$$

wherein $x/y$ is in the range of 1 to 20.

4. An acrylonitrile polymer having the following recurring structural units:

$$-(CH_2-\underset{\underset{CN}{|}}{\overset{\overset{H}{|}}{C}})_x-(CH_2-\underset{\underset{CH_2-\overset{O}{\underset{\|}{C}}-O-CH_3}{|}}{\overset{\overset{H}{|}}{C}}=NH)_y-$$

wherein $x/y$ is in the range of 1 to 20.

5. An acrylonitrile polymer having the following recurring structural units:

$$-(CH_2-\underset{\underset{CN}{|}}{\overset{\overset{CH_3}{|}}{C}})_x-(CH_2-\underset{\underset{CH_2-O-\overset{O}{\underset{\|}{C}}-\overset{O}{\underset{\|}{C}}-O-CH_3}{|}}{\overset{\overset{CH_3}{|}}{C}}=NH)_y-$$

wherein $x/y$ is in the range of 1 to 20.

6. An acrylonitrile polymer having the following recurring structural units:

$$-(CH_2-\underset{\underset{CN}{|}}{\overset{\overset{H}{|}}{C}})_x-(CH_2-\underset{\underset{CH_2-\overset{O}{\underset{\|}{C}}-O-\overset{O}{\underset{\|}{C}}-CH_3}{|}}{\overset{\overset{H}{|}}{C}}=NH)_y-$$

wherein $x/y$ is in the range of 1 to 20.

7. An acrylonitrile polymer having the following recurring structural units:

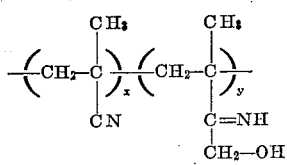

wherein $x/y$ is in the range of 1 to 20.

8. An acrylonitrile polymer having the following recurring structural units:

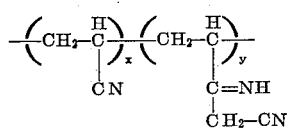

wherein $x/y$ is in the range of 1 to 20.

9. An acrylonitrile polymer having the following recurring structural units:

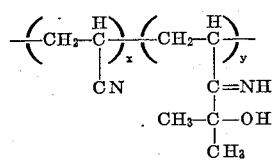

wherein $x/y$ is in the range of 1 to 20.

10. A polymer of acrylic acid which has the following recurring structural units:

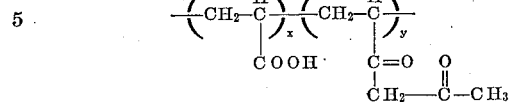

wherein $x/y$ is in the range of 1 to 20.

References Cited by the Examiner

UNITED STATES PATENTS

| | | | |
|---|---|---|---|
| 2,740,773 | 4/1956 | Ham | 260—88.7 |
| 2,743,263 | 4/1956 | Coover et al. | 260—88.7 |
| 2,803,599 | 8/1957 | Tutwiler et al. | 204—158 |
| 2,917,474 | 12/1959 | Fisher et al. | 260—85.5 |
| 2,996,441 | 8/1961 | Nelson et al. | 204—154 |

OTHER REFERENCES

Callinan: Journal Electrochemical Society, vol. 103, 204–158.1 (May 1956), pp. 292–6.

JOSEPH L. SCHOFER, *Primary Examiner.*

MURRAY TILLMAN, JOSEPH R. LIBERMAN, LEON J. BERCOVITZ, HARRY WONG,

*Assistant Examiners.*